United States Patent

Hamamoto et al.

(12) 
(10) Patent No.: US 6,656,642 B2
(45) Date of Patent: Dec. 2, 2003

(54) NON-AQUEOUS ELECTROLYTIC SOLUTION AND LITHIUM SECONDARY BATTERY

(75) Inventors: Toshikazu Hamamoto, Yamaguchi (JP); Akira Ueki, Yamaguchi (JP); Koji Abe, Yamaguchi (JP); Tsutomu Takai, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 152 days.

(21) Appl. No.: 09/836,942

(22) Filed: Apr. 17, 2001

(65) Prior Publication Data

US 2001/0044051 A1 Nov. 22, 2001

(30) Foreign Application Priority Data

Apr. 17, 2000 (JP) ........................................ 2000-115111

(51) Int. Cl.[7] .............................................. H01M 10/40
(52) U.S. Cl. ........................ 429/331; 429/332; 252/364
(58) Field of Search ................................ 429/330, 331, 429/332; 252/364

(56) References Cited

U.S. PATENT DOCUMENTS

| | | | | |
|---|---|---|---|---|
| 5,626,981 A | * | 5/1997 | Simon et al. ............ | 429/330 X |
| 5,712,059 A | * | 1/1998 | Barker et al. ........... | 429/331 X |
| 6,174,629 B1 | * | 1/2001 | Gan et al. ............... | 429/330 X |
| 6,399,255 B2 | * | 6/2002 | Herreyre et al. ............ | 429/331 |
| 6,413,678 B1 | * | 7/2002 | Hamamoto et al. .......... | 429/332 |

FOREIGN PATENT DOCUMENTS

| | | | | |
|---|---|---|---|---|
| JP | 11-067266 | * | 3/1999 | .......... H01M/10/40 |
| JP | 2000-058125 | * | 2/2000 | .......... H01M/10/40 |

* cited by examiner

*Primary Examiner*—Stephen Kalafut
(74) *Attorney, Agent, or Firm*—Reed Smith LLP

(57) ABSTRACT

A non-aqueous electrolytic solution favorably employable for a lithium secondary battery employs a non-aqueous solvent composed of a cyclic carbonate, a linear carbonate and vinylene carbonate, and shows a reduction potential of less than 1 volt, with reference to lithium, or contains chlorine atom-containing organic compounds in an amount of 10 ppm or less, in terms of chlorine atom content.

18 Claims, 5 Drawing Sheets

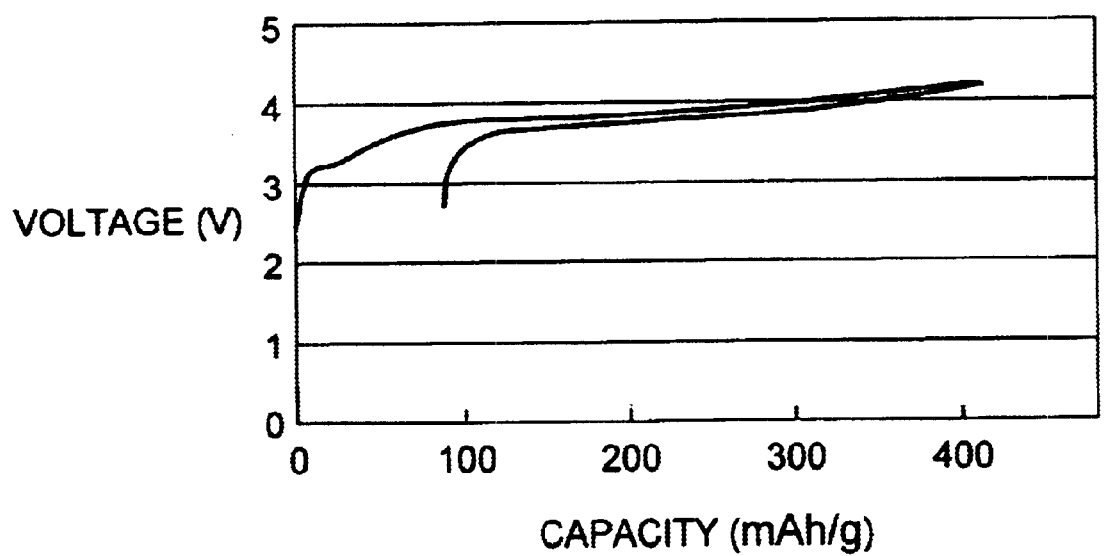
F I G. 1
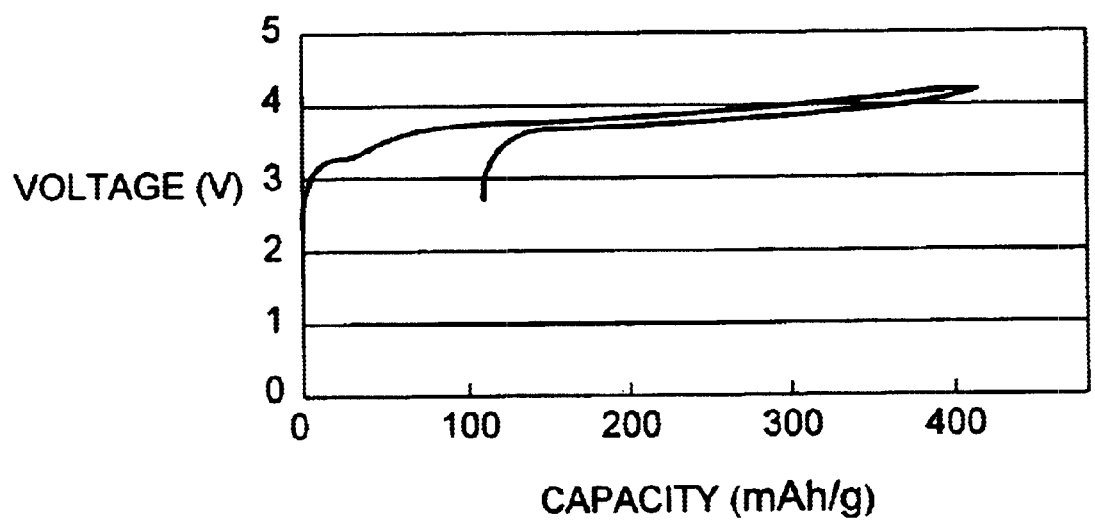
F I G. 2

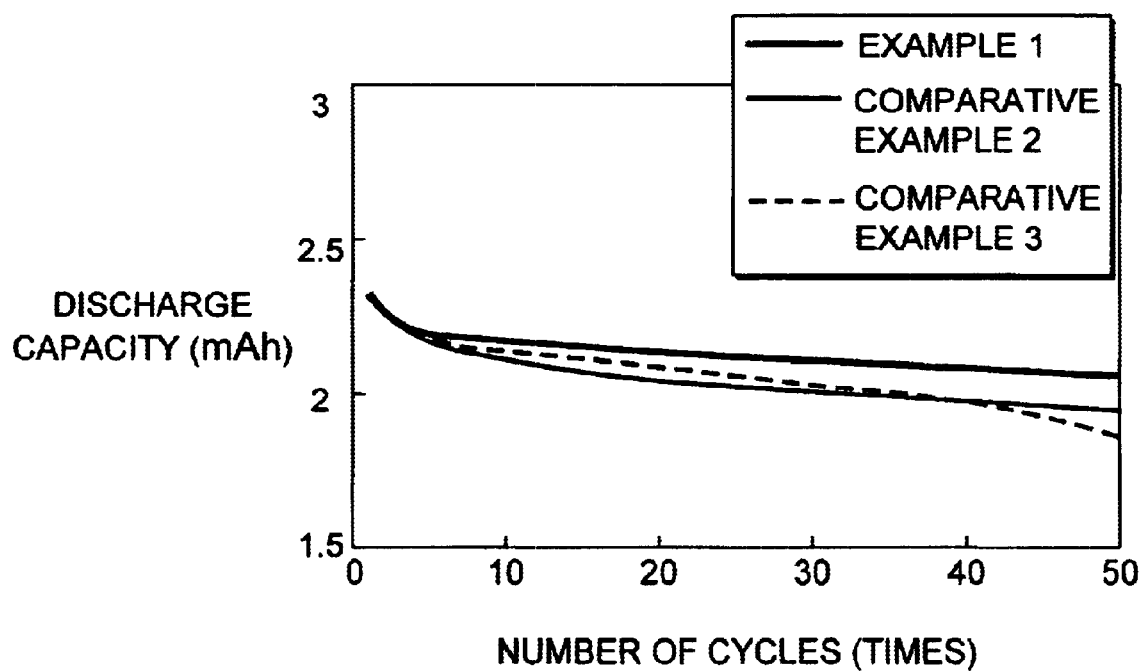
F I G. 3
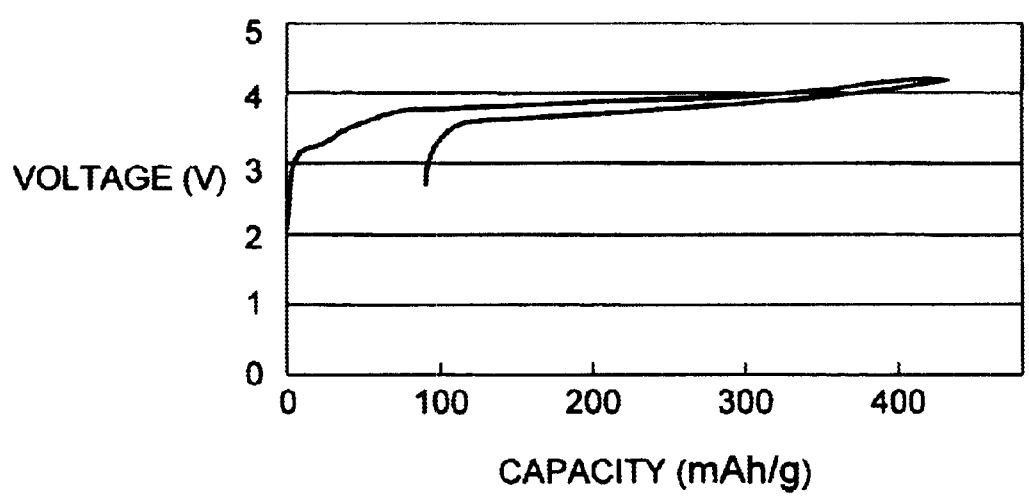
F I G. 4

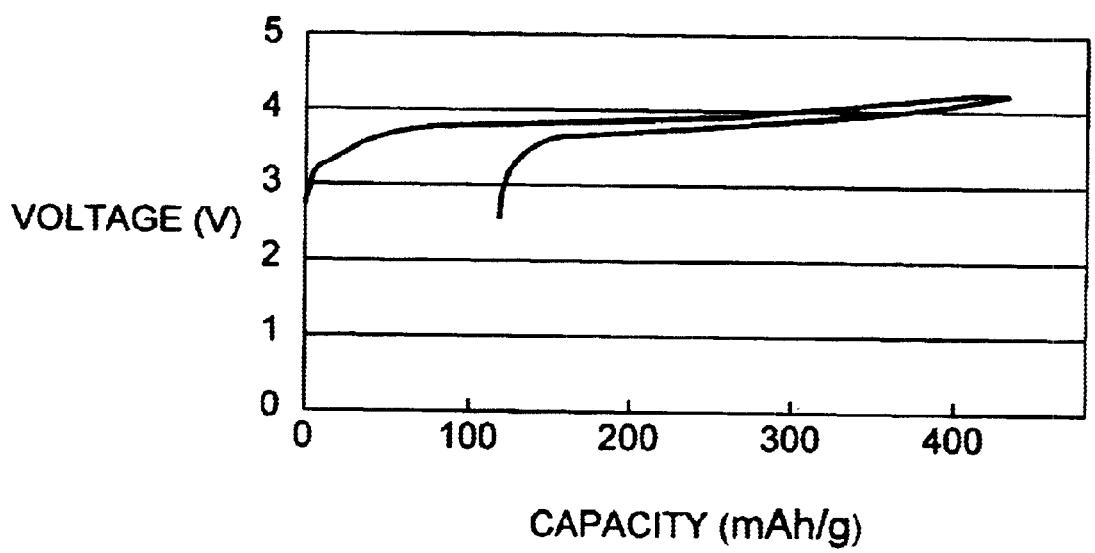
F I G. 5
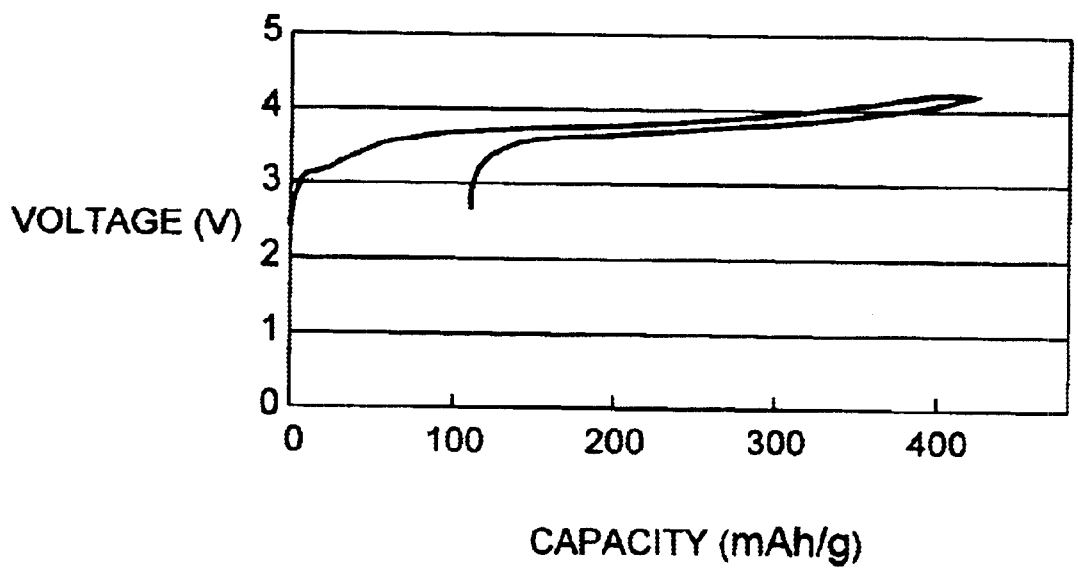
F I G. 6

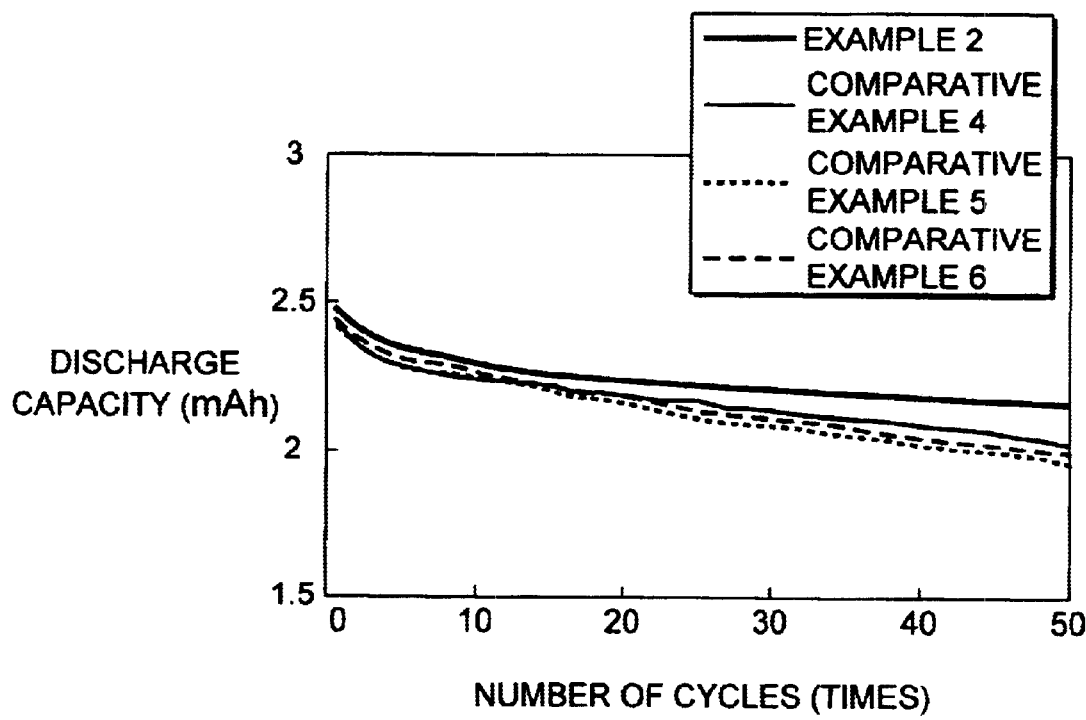
F I G. 7
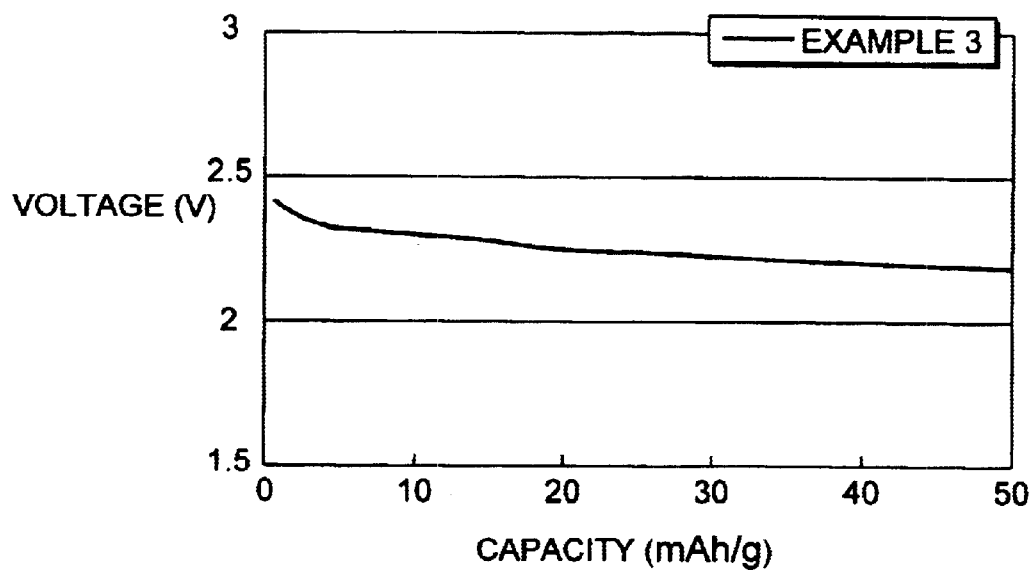
F I G. 8

NON-AQUEOUS ELECTROLYTIC SOLUTION AND LITHIUM SECONDARY BATTERY

This application claims priority of Japanese Application No. 2000-115111 filed Apr. 17, 2000, the complete disclosure of which is hereby incorporated by reference.

FIELD OF THE INVENTION

The present invention relates to a non-aqueous electrolytic solution and a lithium secondary battery employing the non-aqueous electrolytic solution. In particular, the invention relates to a lithium secondary battery having improved electric capacity and cycle characteristics, and a non-aqueous electrolytic solution and non-aqueous solvent which are advantageously employable for preparing the lithium secondary battery.

BACKGROUND OF THE INVENTION

At present, potable small electronic devices such as personal computers, cellular phones, and video recorders equipped with camera are widely used, and a small sized secondary battery having light weight and high electric capacity is desired to provide an electric source for driving such small electronic devices. From the viewpoints of small size, light weight, and high electric capacity, a lithium secondary battery is paid attention.

The lithium secondary battery employs a positive active electrode material comprising a complex oxide such as lithium cobaltate, lithium nickelate, or lithium manganate, a negative active electrode material comprising a carbonaceous material into which lithium ions are able to intercalate and from which lithium ions are able to release, and a non-aqueous electrolytic solution of a lithium salt in a non-aqueous solvent comprising a cyclic carbonate and a linear carbonate. The lithium secondary battery is now studied for improving its characteristics.

Among the carbonaceous materials into which lithium ions are able to intercalate and from which lithium ions are able to release, graphite is considered to be the most preferred negative active electrode material of a lithium secondary battery because of its large electric capacity and advantageous flat electric potential curve, and therefore is employed widely in the art.

There is a problem, however, in that the graphite electrode shows exfoliation on its surface when it is employed in a lithium secondary battery in combination with a non-aqueous solvent for the electrolytic solution which comprises a cyclic carbonate such as ethylene carbonate (EC), propylene carbonate (PC), or butylene carbonate (BC). Simultaneously, the cyclic carbonate is decomposed on the surface of the graphite electrode. The exfoliation of the graphite electrode and decomposition of the cyclic carbonate of the non-aqueous solvent cause decrease of battery characteristics such as electric capacity, cycle characteristics, and storage stability. Particularly, the decrease is apparently observed when the graphite electrode is employed in an electrolytic solution containing propylene carbonate. It is sometimes noted that propylene carbonate decomposes on the surface of the graphite negative electrode when it is subjected to initial charging procedure and that further discharging-charging procedures cannot be done.

For obviating decomposition of an electrolytic solution on the surface of the graphite negative electrode material and exfoliation of the graphite, it has been proposed addition of additive material classified into various compounds. For instance, J. Electrochem. Soc., Vol. 140, No. 6, L 101 (1993) describes that addition of a crown-ether compound (12-crown-4) to an electrolytic solution comprising propylene carbonate and ethylene carbonate obviates decomposition of the electrolytic solution. In this case, however, it is required to use a relatively large amount of an expensive crown-ether compound for effectively obviating the decomposition. Further, the addition of crown-ether still cannot impart to the battery well satisfactory electric characteristics.

U.S. Pat. No. 5,626,981 describes an electrolytic solution comprising a lithium salt and a mixture of at least two aprotic organic solvents of which the first solvent has a high dielectric constant and the second solvent has low viscosity and further contains a soluble compound of the same type as at least one of the solvents and contains at least one unsaturated bond and which can be reduced at the anode at a potential of more than 1 volt with respect to lithium to form a passivation layer. This patent describes that the additive compound is reduced on the anode when the battery is charged, to form a passivation layer on the graphite surface and obviate reduction of other solvent components.

According to the study of the inventors, however, the methods described above cannot give satisfactorily high Coulomb efficiency (i.e., charge-discharge efficiency) at the initial stage. Further, the electric capacity gradually decreases after the charge-discharge cycle is repeated. Thus, the known improvement methods fail to impart satisfactory cycle characteristics and storage stability to the lithium secondary battery.

Further, 1997 Joint International Meeting of The Electrochemical Society, Inc. and International Society of Electrochemistry, Abstracts, P. 153 (1997) describes that a voltamograph obtained in a battery cell comprising a graphite electrode (working electrode)/Li (counter electrode)/Li (reference electrode) and an electrolytic solution of 1M $LiPF_6$ in a solvent of PC/EC/DMC (DMC: dimethyl carbonate) of 1/1/3 by a volume ratio shows a reduction peak at 1 volt, and that the passivation film is formed on the negative electrode at that voltage so as to keep other solvent components from reducing.

Furthermore, J. Electrochem. Soc., Vol. 140, No. 9, L 161 (1995) describes that addition of chloroethylene carbonate to an electrolytic solution is effective to keep propylene carbonate (PC) from decomposing on the graphite electrode surface. It is assumed that a decomposed product of chloroethylene carbonate forms a passivation film on the graphite surface. However, the inhibition of decomposition of the electrolytic solution is not satisfactorily high.

According to the above-described improvement methods, it has become possible to use a cyclic carbonate (which is an excellent non-aqueous solvent) and a carbonaceous electrode having high crystallinity such as a graphite electrode in combination. Nevertheless, the use of the above-mentioned solvent component is still not able to provide a lithium secondary battery showing well satisfactory battery characteristics.

SUMMARY OF THE INVENTION

The present inventors have focused their studies on the use of a non-aqueous solvent mixture of a cyclic carbonate (which shows excellent characteristics as a non-aqueous solvent for an electrolytic solution) and particularly on the effect of vinylene carbonate (VC) for keeping the electrolytic solution from decomposing on the graphite electrode surface.

As a result, it has been discovered that a vinylene carbonate product prepared by a conventional synthetic process does not provide satisfactory battery characteristics, and further the resulting battery does not have reliable battery characteristics. It is further discovered that the vinylene carbonate product prepared by conventional synthetic processes contains a not small amount of chlorine atom-containing organic compounds which are produced in the process for the preparation of vinylene carbonate as by-products. The by-produced chlorine atom-containing organic compounds are incorporated into a non-aqueous solvent of an electrolytic solution when the vinylene carbonate product is mixed with other non-aqueous solvent components. The chlorine atom-containing organic compounds in the non-aqueous solvent of an electrolytic solution bring about increase of reduction potential of the non-aqueous electrolytic solution and cause lowering of the battery characteristics and reliability of the battery.

The present invention resides in a non-aqueous electrolytic solution which comprises a non-aqueous solvent comprising a cyclic carbonate, a linear carbonate and vinylene carbonate, and an electrolyte dissolved in the non-aqueous solvent, and which shows a reduction potential of less than 1 volt (or a reduction potential higher by less than 1 volt), with reference to lithium.

The invention further resides in a non-aqueous electrolytic solution which comprises a non-aqueous solvent comprising a cyclic carbonate, a linear carbonate and vinylene carbonate, and an electrolyte dissolved in the non-aqueous solvent, and which contains one or more chlorine atom-containing organic compounds in an amount of 10 ppm or less, in terms of chlorine atom content.

The invention furthermore resides in a non-aqueous solvent comprising a cyclic carbonate, a linear carbonate and vinylene carbonate, which contains one or more chlorine atom-containing organic compounds in an amount of 10 ppm or less, in terms of chlorine atom content.

The invention furthermore resides in a lithium secondary battery comprising a positive electrode, a graphite negative-electrode having a lattice spacing of 0.34 nm or less in terms of $d_{002}$, and a non-aqueous electrolytic solution which comprises a non-aqueous solvent comprising a cyclic carbonate, a linear carbonate and vinylene carbonate, and an electrolyte dissolved in the non-aqueous solvent, and which shows a reduction potential of less than 1 volt, with reference to lithium.

The invention furthermore resides in a lithium secondary battery comprising a positive electrode, a graphite negative-electrode having a lattice spacing of 0.34 nm or less in terms of $d_{002}$, and a non-aqueous electrolytic solution which comprises a non-aqueous solvent comprising a cyclic carbonate, a linear carbonate and vinylene carbonate, and an electrolyte dissolved in the non-aqueous solvent, and which contains one or more chlorine atom-containing organic compounds in an amount of 10 ppm or less, in terms of chlorine atom content.

The characteristic features of the invention reside specifically in the characteristics and composition of the non-aqueous electrolytic solution or the non-aqueous solvent for the electrolytic solution. Preferred are as follows:

(1) The reduction potential of the electrolytic solution is 0.9 volt or less, preferably 0.8 volt or less, more preferably in the range of 0.7 volt to 0.8 volt, with reference to lithium.

(2) The amount of chlorine atom-containing organic compounds is in an amount of 10 ppm or less, preferably 5 ppm or less, more preferably 2.5 ppm or less, in terms of chlorine atom content.

(3) The chlorine atom-containing organic compounds are incorporated into the electrolytic solution as contaminants of the vinylene carbonate.

(4) The contaminants are contained in the vinylene carbonate in an amount of not more than 100 ppm, in terms of chlorine atom content.

The mechanism of lowering of reduction potential of the non-aqueous electrolytic solution of the invention by the decrease of the chlorine atom-containing compounds as well as the mechanism of its function to improve battery characteristics of the lithium secondary battery are not clearly understood. It is assumed, however, as follows:

Vinylene carbonate (VC) products prepared by the conventionally employed synthetic methods contain at least 3,000 ppm of the below-mentioned chlorine atom-containing organic compounds:

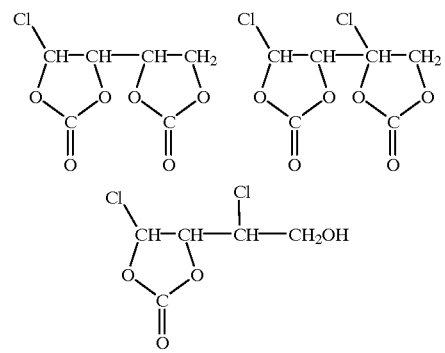

When the vinylene carbonate product containing such a large amount of the plural chlorine atom-containing organic compounds is incorporated into a non-aqueous solvent of the electrolytic solution in an ordinary addition amount of 1 to 10 wt. %, the chlorine atom-containing organic compounds are also incorporated into the non-aqueous solvent in an amount of approx. 30 to 300 ppm.

The chlorine atom-containing organic compounds show a reduction potential higher than vinylene carbonate and other components of the electrolytic solution, and therefore they decompose on the graphite negative electrode surface prior to the reduction of vinylene carbonate and other components, so as to form a film coverage which can keep the electrolytic solution from decompositions of vinylene carbonate and other components.

However, since thus formed film coverage on the graphite electrode surface contains chlorine therein and becomes thick, the film cannot satisfactorily keep the electrolytic solution from decomposition. In other words, the chlorine atom-containing organic compounds attached to vinylene carbonate disturb the battery characteristics-improving function of vinylene carbonate.

In consideration of the above-described discovery, the inventors have developed a process for preparing vinylene carbonate of high purity, namely, containing a markedly less amount of the chlorine atom-containing organic compound as well as a purification process.

J. Am. Chem. Soc., 75, 1263 (1953) and other publications teach that vinylene carbonate is prepared by the first step of synthesizing monochloroethylene carbonate by chlorination of ethylene carbonate (EC), and the second step of removing hydrogen chloride from the synthesized monochloroethylene carbonate in a ether solvent having a low boiling temperature utilizing an amine compound. According to the new process developed by the inventors, if the solvent employed in the second step is replaced with an ester solvent having a high boiling temperature and the vinylene carbonate product is purified by distillation or crystallization, a high purity vinylene carbonate product containing little amount of chlorine atom-containing organic compounds can be prepared.

An electrolytic solution employing thus prepared vinylene carbonate of high purity is effective to provide a lithium secondary battery showing markedly improved electric capacity, cycle characteristics and storage stability.

BRIEF DESCRIPTION OF DRAWINGS

FIG. 1 illustrates charge-discharge characteristics of a lithium secondary battery of Example 1.

FIG. 2 illustrates charge-discharge characteristics of a lithium secondary battery of Comparison Example 1.

FIG. 3 illustrates cycle characteristics of lithium secondary batteries of Example 1, Comparison Example 2, and Comparison Example 3.

FIG. 4 illustrates charge-discharge characteristics of a lithium secondary battery of Example 2.

FIG. 5 illustrates charge-discharge characteristics of a lithium secondary battery of Comparison Example 4.

FIG. 6 illustrates charge-discharge characteristics of a lithium secondary battery of Comparison Example 6.

FIG. 7 illustrates cycle characteristics of lithium secondary batteries of Example 2, Comparison Example 4, Comparison Example 5, and Comparison Example 6.

FIG. 8 illustrates charge-discharge characteristics of a lithium secondary battery of Example 3.

DETAILED DESCRIPTION OF THE INVENTION

Figure 9:
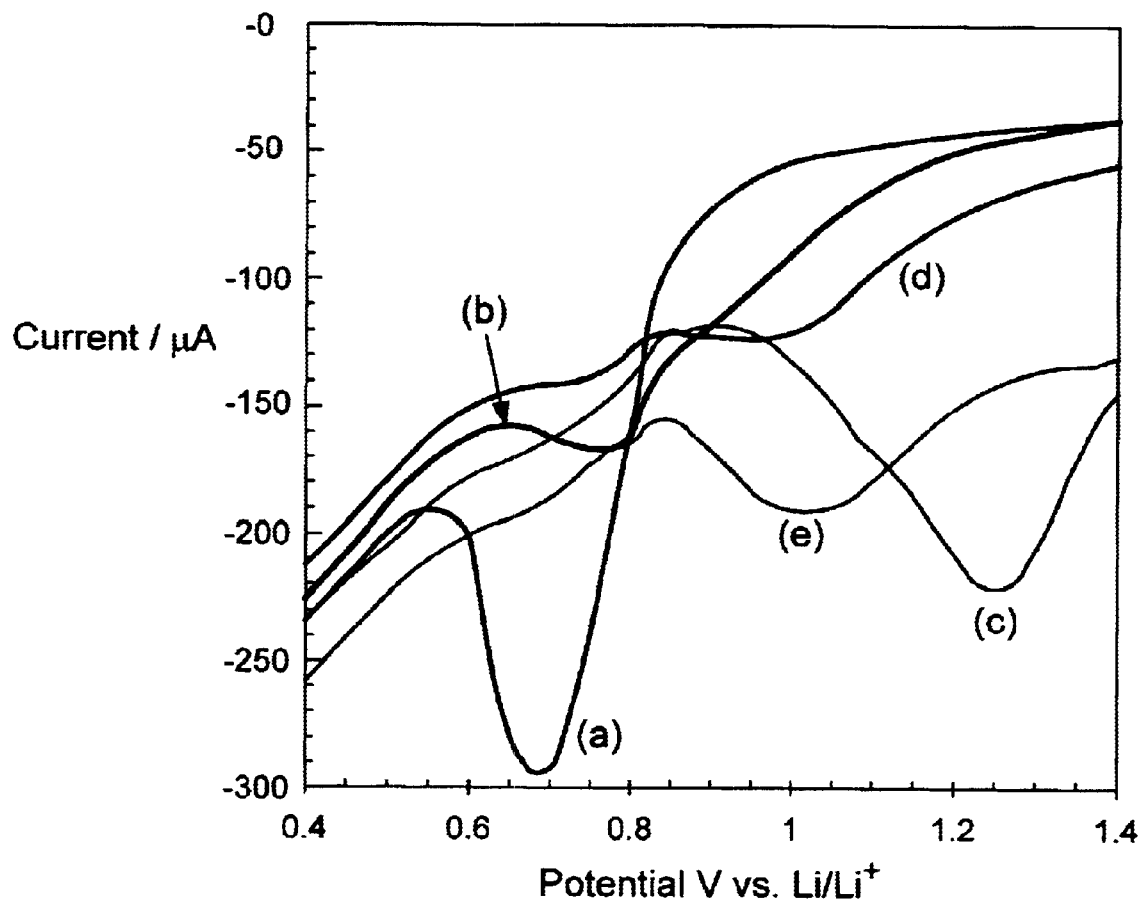
FIG. 9 illustrates results of reduction potential measurements of various vinylene carbonate-containing electrolytic solutions.

The non-aqueous electrolytic solution of the invention preferably contains vinylene carbonate (VC) in an amount of 0.01 to 10 wt. %, more preferably 0.1 to 5 wt. %. If an extremely less amount of vinylene carbonate is incorporated, no decomposition of the electrolytic solution on the graphite electrode takes place. If vinylene carbonate is incorporated in an excessively large amount, the battery characteristics lower. The chlorine atom-containing organic compound is preferably contained in an amount of 100 ppm or less, more preferably 50 ppm or less, in terms of chlorine atom content.

The cyclic carbonate can be ethylene carbonate (EC), propylene carbonate (PC), or butylene carbonate (BC). The cyclic carbonate can be employed singly or in combination. The linear carbonate can be dimethyl carbonate (DMC), methyl ethyl carbonate (MEC), diethyl carbonate (DEC), methyl propyl carbonate (MPC), or methyl butyl carbonate (MBC). The linear carbonate can be also employed singly or in combination. The cyclic carbonate and linear carbonate can be preferably employed in a volume ratio of 2:8 to 6:4.

Examples of the electrolytes employed for preparing the non-aqueous electrolytic solution include $LiPF_6$, $LiBF_4$, $LiClO_4$, $LiN(SO_2CF_3)_2$, $LiN(SO_2C_2F_5)_2$, and $LiC(SO_2CF_3)_3$. The electrolytes can be employed singly or in combination. Generally, the electrolyte can be incorporated into the non-aqueous solvent in such an amount to give an electrolytic solution of 0.1 M to 3 M, preferably 0.5 M to 1.5 M.

The non-aqueous electrolytic solution of the invention is generally prepared by dissolving the electrolyte in a mixture of a cyclic carbonate, a linear carbonate and a high purity vinylene carbonate.

The non-aqueous electrolytic solution of the invention is preferably employed as a constitutional component of a lithium secondary battery. Materials other than the electrolytic solution are known, and the known materials can be employed without limitation.

For instance, the positive electrode active material can be a complex metal oxide comprising one metal element selected from the group consisting of cobalt, nickel, manganese, chromium, vanadium and iron and lithium. Examples of the complex metal oxides include $LiCoO_2$, $LiMn_2O_4$, and $LiNiO_2$.

The positive electrode can be prepared by kneading a mixture of the above-mentioned positive electrode active material, an electro-conductive agent such as acetylene black or carbon black, a binder such as poly(vinylidene fluoride) (PVDF) or polytetrafluoroethylene (PTFE), and an N-methylpyrrolidone solvent to produce a positive electrode composition, coating the positive electrode composition on a metal plate such as aluminum foil or stainless sheet, drying the coated composition at 50 to 250° C., and molding the dry film under pressure.

The negative electrode preferably comprises a natural or artificial graphite having a lattice spacing (or lattice distance, in terms of $d_{002}$) of 0.34 nm or less. The negative electrode can be prepared by kneading a mixture of the above-mentioned graphite, a binder such as PVDF, PTFE or ethylene-propylene diene monomer (EPDM), and an N-methylpyrrolidone solvent to produce a negative electrode composition, coating the negative electrode composition on a metal plate such as aluminum foil or stainless sheet, drying the coated composition at 50 to 250° C., and molding the dry film under pressure.

There are no specific limitations with respect to the structure of the lithium secondary battery of the invention. For instance, the lithium secondary battery can be a battery of coin type comprising a positive electrode, a negative electrode, plural separators, and the electrolytic solution, or a cylindrical, prismatic or laminate battery.

EXAMPLES

[Vinylene Carbonate]

Three vinylene carbonates employed in the following Examples 1 to 3 and Comparison Examples 1 to 6 were purchased or prepared in the manners described below.

(1) Aldrich Vinylene Carbonate

Vinylene carbonate available from Aldrich Chemical Company Inc., on the market was purchased. This was named "Aldrich vinylene carbonate".

(2) Synthesis of Vinylene Carbonate by conventional method

The synthesis was carried out in the manner described in J. Am. Chem. Soc., 75, 1263 (1953) and J. Am. Chem. Soc., 77, 3789 (1955). The details are as follows.

Gaseous chlorine was blown into ethylene carbonate (600 g) which was previously purified by distillation. In the course of blowing, ultraviolet light was applied to the ethylene carbonate at 65° C. for 24 hours for performing a reaction. After the reaction was complete, monochloroethylene carbonate (560 g) was isolated by distillation. The isolated monochloroethylene carbonate (493 g) was dissolved in dry diethyl ether (500 mL). Triethylamine (440 g) was dropwise added to the resulting solution under reflux for 6 hours. The solution was further refluxed under stirring for 14 hours. The produced solid triethylamine hydrochloride was filtered off and washed with a mixture of ether and n-hexane. The solvent and excessive amine were first distilled off. The distillation was further carried out at 30 mmHg to collect a vinylene carbonate distillate (290 g). The vinylene carbonate distillate was then subjected to fractional distillation at 30 mmHg to obtain 104 g of vinylene carbonate (b.p.: 73° C.). The obtained vinylene carbonate was named "Conventional vinylene carbonate".

(3) Synthesis of High Purity Vinylene Carbonate

Monochloroethylene carbonate was prepared in the same manner as in (2) above. The prepared monochloroethylene carbonate (494 g) was dissolved in dibutyl carbonate (500 mL), and placed in a reaction vessel (2-liter volume). To the reaction vessel was dropwise added triethylamine (440 g) at 50° C. for 6 hours, for performing a reaction. The mixture was stirred further for 14 hours. The reaction mixture was cooled to room temperature, and triethylamine hydrochloride was filtered off and washed sufficiently with dibutyl carbonate. The filtrate (2,100 g) was placed at 30 mmHg to distill excessive triethylamine off, and then to collect 390 g of a vinylene carbonate distillate. The vinylene carbonate distillate was treated with silica gel and then subjected to fractional distillation at 30 mmHg to obtain 195 g of vinylene carbonate (b.p.: 73° C.) containing an extremely small amount of contaminant. The obtained vinylene carbonate was named "High purity vinylene carbonate".

[Gas Chromatographic Mass Analysis of Vinylene Carbonate]

According to each of the gas chromatographic analyses for Aldrich vinylene carbonate and Conventional vinylene carbonate, a small amount of various contaminants was detected. Gas chromatographic mass analysis indicated that the contaminants contained the aforementioned three chlorine-containing organic compounds which were considered to be produced in the course of synthesis of vinylene carbonate. In contrast, High purity vinylene carbonate contained almost no contaminants. Chlorine-containing compounds such as the aforementioned three chlorine-containing compounds were not detected.

[Chlorine Content of Vinylene Carbonate]

Vinylene carbonate was burnt in oxyhydrogen flame, and the produced gas was absorbed by water. The gas-containing water was analyzed by ion chromatography to examine the chloride ion content. The result is set forth in Table 1. It was found that Aldrich vinylene carbonate and Conventional vinylene carbonate had a high chlorine content such as 3,200 ppm and 3,550 ppm, respectively. In contrast, High purity vinylene carbonate had a less chlorine content such as 29 ppm

TABLE 1

| Vinylene Carbonate Sample | Chlorine content |
| --- | --- |
| Aldrich vinylene carbonate | 3,200 ppm |
| Conventional vinylene carbonate | 3,550 ppm |
| High purity vinylene carbonate | 29 ppm |

Example 1

1) Preparation of electrolytic solution

High purity vinylene carbonate was added to a mixture (1:2, volume ratio) of propylene carbonate (PC) and dimethylene carbonate (DMC) in an amount of 2 weight %, to prepare a non-aqueous solvent. $LiPF_6$ was dissolved in the non-aqueous solvent to give a 1M concentration. Thus, an electrolytic solution was prepared.

2) Preparation of lithium secondary battery and measurement of battery characteristics $LiCoO_2$ (positive electrode active material, 80 wt. %), acetylene black (electro-conductive material, 10 wt. %), and poly(vinylidene fluoride) (binder, 10 wt. %) were mixed. The resulting mixture was diluted with 1-methyl-2-pyrrolidone. Thus produced positive electrode composition was coated on aluminum foil, dried, and molded under pressure, to give a positive electrode.

Natural graphite ($d_{002}$=0.3354, 90 wt. %) and poly(vinylidene fluoride) (binder, 10 wt. %) were mixed. The mixture was then diluted with 1-methyl-2-pyrrolidone. Thus produced negative electrode composition was coated on copper foil, dried, and molded under pressure, to give a negative electrode.

It was adjusted that the positive electrode and negative electrode had almost the same electric capacity.

The positive and negative electrodes, a micro-porous polypropylene film separator, and the electrolytic solution were combined to give a coin-type battery (diameter: 20 mm, thickness: 3.2 mm).

The coin-type battery was charged for 5 hours at room temperature (25° C.) with a constant electric current (0.8 mA) to reach 4.2 V and then the charging was continued under a constant voltage of 4.2 V. Subsequently, the battery was discharged to give a constant electric current (0.8 mA). The discharge was continued to give a terminal voltage of 2.7 V.

In FIG. 1, the initial charge-discharge characteristics are graphically shown. The axis of ordinates is for battery voltage (V), and the axis of abscissas is for capacity (mAh/g carbon). Further, the charge-discharge process was repeated to examine variation of discharge capacity after the cyclic use.

Comparison Example 1

A secondary battery was prepared in the same manner as in Example 1, except for employing vinylene carbonate.

The prepared secondary battery was subjected to the charge-discharge procedure. In the initial stage, propylene carbonate decomposed, and the battery could not be so charged as to reach the predetermined voltage. Therefore, discharge could not be done. After these charge-discharge procedures, the battery was disassembled. Exfoliation of the graphite negative electrode was observed.

Comparison Example 2

A secondary battery was prepared in the same manner as in Example 1, except for employing Aldrich vinylene carbonate in place of High purity vinylene carbonate. The prepared secondary battery was subjected to the charge-discharge procedure. The initial charge-discharge characteristics are graphically shown in FIG. 2.

Comparison Example 3

A secondary battery was prepared in the same manner as in Example 1, except for employing Conventional vinylene carbonate in place of High purity vinylene carbonate.

The prepared secondary battery was subjected to the charge-discharge procedure.

The initial Coulomb efficiency of the secondary battery of each of Example 1, and Comparison Examples 1 to 3 is set forth in Table 2. It was confirmed that the use of High purity vinylene carbonate gives good Coulomb efficiency.

TABLE 2

(Non-aqueous solvent: PC/DMC = 1/2 (volume ratio) + VC)

|  | Vinylene Carbonate | Coulomb Efficiency |
|---|---|---|
| Example 1 | High purity vinylene carbonate (2 wt. %) | 78% |
| Com.Ex. 1 | None | Could not measured |
| Com.Ex. 2 | Aldrich vinylene carbonate (2 wt. %) | 73% |
| Com.Ex. 3 | Conventional vinylene carbonate (2 wt. %) | 74% |

In FIG. 3, the cycle characteristics of each of the secondary batteries of Example 1, Comparison Example 2, and Comparison Example 3 are graphically shown. The axis of ordinates is for discharge capacity (mAh), and the axis of abscissas is for number of cycles.

As is seen from the graph of FIG. 3, the secondary battery (Example 1) using High purity vinylene carbonate is superior to the secondary battery (Comparison Example 2) using Aldrich vinylene carbonate and the secondary battery (Comparison Example 3) using Conventional vinylene carbonate, in the cycle characteristics.

Example 2

A secondary battery was prepared in the same manner as in Example 1, except for employing a solvent mixture of ethylene carbonate and dimethyl carbonate (EC:DMC=1:1, volume ratio) in place of the solvent mixture of propylene carbonate and dimethyl carbonate (PC:DMC=1:2, volume ratio).

The prepared secondary battery was subjected to the charge-discharge procedure. The initial charge-discharge characteristics are graphically shown in FIG. 4.

Comparison Example 4

A secondary battery was prepared in the same manner as in Example 2, except for using no vinylene carbonate.

The prepared secondary battery was subjected to the charge-discharge procedure. The initial charge-discharge characteristics are graphically shown in FIG. 5.

Comparison Example 5

A secondary battery was prepared in the same manner as in Example 2, except for employing Aldrich vinylene carbonate in place of High purity vinylene carbonate. The prepared secondary battery was subjected to the charge-discharge procedure.

Comparison Example 6

A secondary battery was prepared in the same manner as in Example 2, except for employing Conventional vinylene carbonate in place of High purity vinylene carbonate.

The prepared secondary battery was subjected to the charge-discharge procedure. The initial charge-discharge characteristics are graphically shown in FIG. 6.

Example 3

A secondary battery was prepared in the same manner as in Example 1, except for employing a solvent mixture of propylene carbonate, ethylene carbonate and dimethyl carbonate (PC:EC:DMC=1:1:2, volume ratio) in place of the solvent mixture of propylene carbonate and dimethyl carbonate (PC:DMC=1:2, volume ratio).

The initial Coulomb efficiency of the secondary battery of each of Examples 2 and 3, and Comparison Examples 4 to 6 is set forth in Table 3. It was confirmed that the use of High purity vinylene carbonate gives good Coulomb efficiency.

TABLE 3

(Non-aqueous solvent: PC/DMC = 1/1 (volume ratio) + VC)

|  | Vinylene Carbonate | Coulomb Efficiency |
|---|---|---|
| Example 2 | High purity vinylene carbonate (2 wt. %) | 79% |
| Com.Ex. 4 | None | 72% |
| Com.Ex. 5 | Aldrich vinylene carbonate (2 wt. %) | 75% |
| Com.Ex. 6 | Conventional vinylene carbonate (2 wt. %) | 74% |
| Example 3 | High purity vinylene carbonate* (2 wt. %) | 80% |

Remarks:
The non-aqueous solvent is PC/EC/DMC = 1/1/2 (volume ratio) + VC.

In FIG. 7, the cycle characteristics of each of the secondary batteries of Example 2, Comparison Example 4, Comparison Example 5, and Comparison Example 6 are graphically shown. The axis of ordinates is for discharge capacity (mAh), and the axis of abscissas is for number of cycles.

As is seen from the graph of FIG. 7, the secondary battery (Example 2) using High purity vinylene carbonate is superior to the secondary battery (Comparison Example 4) using no vinylene carbonate, the secondary battery (Comparison Example 5) using Aldrich vinylene carbonate and the secondary battery (Comparison Example 6) using Conventional vinylene carbonate, in the cycle characteristics.

In FIG. 8, the cycle characteristics of the secondary battery of Example 3 (non-aqueous solvent is replaced) are graphically shown. The axis of ordinates is for discharge capacity (mAh), and the axis of abscissas is for number of cycles. It was confirmed that the secondary battery of Example 3 has good cycle characteristics.

Examples 4 to 6

A secondary battery was prepared in the same manner as in Example 1, except for employing a solvent mixture set forth in Table 4.

The initial Coulomb efficiency of the secondary battery is set forth in Table 4. It was confirmed that the secondary battery has good cycle characteristics similar to those of the secondary battery of Example 1.

TABLE 4

(Non-aqueous solvent: Base solvent mixture + VC 2 wt. %)

|  | Base solvent mixture | Coulomb Efficiency |
|---|---|---|
| Example 4 | PC/EC/MEC = 5/30/65 | 81% |
| Example 5 | PC/EC/DEC = 5/30/65 | 80% |
| Example 6 | PC/EC/DEC/DMC = 5/30/30/35 | 81% |

[Measurement of Reduction Potential]

The reduction potential was measured by the procedure described in 1997 Join International Meeting of The Electrochemical Society, Inc. and International Society of Electrochemistry, Abstracts, p. 153 (1997).

To 10 mg of natural graphite powder was mixed with 10 wt. % of poly(vinylidene fluoride) (binder). To the mixture was further added N-methylpyrrolidone, so as to prepare a slurry. The slurry was coated on a stainless steel sheet (surface area: 2 cm$^2$) for manufacturing a working electrode. Then, a triode cell composed of the working electrode, a lithium metal counter electrode and a lithium metal reference electrode.

Separately, a non-aqueous solvent mixture of propylene carbonate, ethylene carbonate, and dimethyl carbonate (PC:EC:DMC=1:1:3, volume ratio) was prepared. Into the non-aqueous solvent was placed LiPF$_6$ (1M), to give a base electrolytic solution. Using the base electrolytic solution, the following five electrolytic solutions were prepared.

(a) Base electrolytic solution (b) 5 wt. % of High purity vinylene carbonate was added to the base electrolytic solution (c) 5 wt. % of monochloroethylene carbonate was added to the base electrolytic solution (d) 5 wt. % of High purity vinylene carbonate and 0.05 wt. % of monochloroethylene carbonate were added to the base electrolytic solution (e) 5 wt. % of High purity vinylene carbonate and 0.25 wt. % of monochloroethylene carbonate were added to the base electrolytic solution In the triode cell was placed the electrolytic solution, and the reduction potential was measured at room temperature and at a potential scanning rate of 0.1 mV/sec. The results are illustrated in FIG. 9. The graph of FIG. 9 indicates that the peak of reduction potential of High purity vinylene carbonate is less than 1 V, specifically less than 0.9 V, more specifically less than 0.8 V, most specifically in the range of 0.7 V to 0.8 V.

What is claimed is:

1. A non-aqueous electrolytic solution which comprises a non-aqueous solvent comprising a cyclic carbonate other than vinylene carbonate, a linear carbonate and vinylene carbonate, one or more chlorine atom-containing organic compounds in an amount of 10 ppm or less, in terms of chlorine atom content, and an electrolyte dissolved in the non-aqueous solvent, and which shows a reduction potential of less than 1 volt, with reference to lithium.

2. The non-aqueous electrolytic solution of claim 1, wherein the reduction potential of the electrolytic solution is 0.8 volt or less, with reference to lithium.

3. The non-aqueous electrolytic solution of claim 2, wherein the reduction potential of the electrolytic solution is in the range of 0.7 volt to 0.8 volt, with reference to lithium.

4. The non-aqueous electrolytic solution of claim 1, which contains one or more chlorine atom-containing organic compounds in an amount of 5 ppm or less, in terms of chlorine atom content.

5. The non-aqueous electrolytic solution of claim 1, which contains one or more chlorine atom-containing organic compounds in an amount of 2.5 ppm or less, in terms of chlorine atom content.

6. The non-aqueous electrolytic solution of claim 1, which the chlorine atom-containing organic compounds are incorporated into the electrolytic solution as contaminants of the vinylene carbonate.

7. The non-aqueous electrolytic solution of claim 6, which the contaminants are contained in the vinylene carbonate in an amount of not more than 100 ppm, in terms of chlorine atom content.

8. A non-aqueous electrolytic solution which comprises a non-aqueous solvent comprising a cyclic carbonate other than vinylene carbonate, a linear carbonate and vinylene carbonate, and an electrolyte dissolved in the non-aqueous solvent, and which contains one or more chlorine atom-containing organic compounds in an amount of 10 ppm or less, in terms of chlorine atom content.

9. The non-aqueous electrolytic solution of claim which contains one or more chlorine atom-containing organic compounds in an amount of 5 ppm or less, in terms of chlorine atom content.

10. A non-aqueous solvent comprising a cyclic carbonate other than vinylene carbonate, a linear carbonate and vinylene carbonate, which contains one or more chlorine atom-containing organic compounds in an amount of 10 ppm or less, in terms of chlorine atom content.

11. The non-aqueous solvent of claim 10, which contains one or more chlorine atom-containing organic compounds in an amount of 5 ppm or less, in terms of chlorine atom content.

12. The non-aqueous solvent of claim 11, which contains one or more chlorine atom-containing organic compounds in an amount of 2.5 ppm or less, in terms of chlorine atom content.

13. A lithium secondary battery comprising a positive electrode, a graphite negative-electrode having a lattice spacing of 0.34 nm or less in terms of $d_{002}$, and a non-aqueous electrolytic solution which comprises a non-aqueous solvent comprising a cyclic carbonate other than vinylene carbonate, a linear carbonate and vinylene carbonate, one or more chlorine atom-containing organic compounds in an amount of 10 ppm or less, in terms of chlorine atom content, and an electrolyte dissolved in the non-aqueous solvent, and which shows a reduction potential of less than 1 volt, with reference to lithium.

14. The lithium secondary battery of claim 13, wherein the reduction potential of the electrolytic solution is 0.8 volt or less, with reference to lithium.

15. The lithium secondary battery of claim 14, wherein the reduction potential of the electrolytic solution is in the range of 0.7 volt to 0.8 volt, with reference to lithium.

16. The lithium secondary battery of claim 13, wherein the non-aqueous electrolytic solution contains one or more chlorine atom-containing organic compounds in an amount of 5 ppm or less, in terms of chlorine atom content.

17. A lithium secondary battery comprising a positive electrode, a graphite negative-electrode having a lattice spacing of 0.34 nm or less in terms of $d_{002}$, and a non-aqueous electrolytic solution which comprises a non-aqueous solvent comprising a cyclic carbonate other than vinylene carbonate, a linear carbonate and vinylene carbonate, and an electrolyte dissolved in the non-aqueous solvent, and which contains one or more chlorine atom-containing organic compounds in an amount of 10 ppm or less, in terms of chlorine atom content.

18. The lithium secondary battery of claim 17, wherein the non-aqueous electrolytic solution contains one or more chlorine atom-containing organic compounds in an amount of 5 ppm or less, in terms of chlorine atom content.

* * * * *